(12) United States Patent
Smeulders

(10) Patent No.: US 11,345,074 B2
(45) Date of Patent: May 31, 2022

(54) MOULD, MOULD SYSTEM, THERMOFORMING DEVICE, AND METHOD FOR THERMOFORMING

(71) Applicant: Bosch Sprang B.V, Sprang-Capelle (NL)

(72) Inventor: Gijsbertus Adrianus Johannes Baptist Smeulders, Waalwijk (NL)

(73) Assignee: BOSCH SPRANG B.V., Sprang-Capelle (NL)

( * ) Notice: Subject to any disclaimer, the term of this patent is extended or adjusted under 35 U.S.C. 154(b) by 766 days.

(21) Appl. No.: 16/074,819

(22) PCT Filed: Feb. 8, 2017

(86) PCT No.: PCT/EP2017/000174
§ 371 (c)(1),
(2) Date: Aug. 2, 2018

(87) PCT Pub. No.: WO2017/137161
PCT Pub. Date: Aug. 17, 2017

(65) Prior Publication Data
US 2019/0039280 A1 Feb. 7, 2019

(30) Foreign Application Priority Data
Feb. 8, 2016 (NL) ...................................... 2016238

(51) Int. Cl.
*B29C 51/42* (2006.01)
*B29C 51/32* (2006.01)
*B29C 51/44* (2006.01)
*B29C 51/46* (2006.01)

(52) U.S. Cl.
CPC .......... *B29C 51/426* (2013.01); *B29C 51/428* (2013.01); *B29C 51/32* (2013.01); *B29C 51/44* (2013.01); *B29C 51/46* (2013.01); *B29K 2995/0041* (2013.01)

(58) Field of Classification Search
CPC ..... B29C 51/426; B29C 51/428; B29C 51/32; B29C 51/44; B29C 51/46
See application file for complete search history.

(56) References Cited

U.S. PATENT DOCUMENTS 3,832,102 A * 8/1974 Alroy ...................... B29C 51/20
425/292
3,947,205 A * 3/1976 Edwards ............. B29C 49/0073
425/529
6,394,783 B1 * 5/2002 Dalgewicz, III ...... B29C 51/225
264/210.5

* cited by examiner

*Primary Examiner* — Joseph S Del Sole
*Assistant Examiner* — John Robitaille
(74) *Attorney, Agent, or Firm* — Tarolli, Sundheim, Covell & Tummino LLP

(57) ABSTRACT

The mould comprises a base plate and a plurality of forming areas, wherein each forming area comprises a cavity in the base plate and a forming sleeve placed in the cavity. Each forming area further comprises first heat means for heating or keeping heated the forming sleeve relative to the base plate, such that the temperature of the part of the film which lies against the forming sleeve during cooling remains above a glass temperature of the plastic long enough to obtain a product with an at least partially crystalline structure.

28 Claims, 3 Drawing Sheets ps://prevwww.google.com/patents/US11345074
MOULD, MOULD SYSTEM, THERMOFORMING DEVICE, AND METHOD FOR THERMOFORMING

CROSS-REFERENCE TO RELATED APPLICATIONS

This application is the United States National Phase of Patent Application No. PCT/EP2017/000174 filed 8 Feb. 2017, which claims priority to Netherland Patent Application No. 2016238 filed 8 Feb. 2016, each of which are incorporated herein by reference.

BACKGROUND OF THE INVENTION

The present invention relates to a mould, to a mould system comprising such a mould. The invention further relates to a thermoforming device equipped with such a mould or mould system, and to a method for thermoforming a product using such a thermoforming device.

A mould suitable for thermoforming a product from a plastic film as defined in the preamble of claim 1 is already known. Such a mould comprises a base plate and a plurality of forming areas, wherein each forming area comprises a cavity in the base plate and a forming sleeve placed in the cavity.

Thermoforming is a known technique. It makes use of the fact that with sufficient heating the form of thermoplastic materials such as polypropylene (PP), polystyrene (PS), polyethylene (PET) and polylactic acid (PLA) can be changed.

A typical thermoforming device for forming the heated material comprises two moulds, an upper and lower mould. The heated plastic material, preferably in the form of a film, is carried between the two moulds. At the start of the process the lower mould moves upward and takes up a pre-cutting position or forming position. The plastic material will be carried into the mould cavities of the lower mould using a pre-stretcher, compressed air and/or vacuum. The mould cavity is formed here by a forming sleeve and a forming base which are placed in a cavity in the base plate. In the present prior art this forming sleeve is cooled directly or indirectly and the film which comes into contact with this cooled sleeve will take on a fixed form.

In the present prior art the lower and upper mould are kept very precisely at an identical temperature of about 20 degrees Celsius, with a maximum variation of for instance ±1.5 degrees Celsius, in order to prevent cutting problems and damage of the mould. In a determined type of mould, a so-called forming-cutting mould, a punching stroke will finally take place, wherein the lower mould performs a short upward movement. A cutting sleeve is in this type of mould carried into the cavity of the base plate. This cutting sleeve is likewise sleeve-like or jacket-like, and defines a cavity in which the forming sleeve is placed. During said punching stroke the cutting sleeve in the lower mould and a cutting plate in the upper mould will move along each other in order to cut the product from the film.

The cutting sleeve in the lower mould and the cutting plate in the upper mould have a very precise cutting clearance, which is necessary for good cutting properties. After the cutting stroke the lower mould will move downward, and optionally tilt, in order to thus eject the products from the mould cavity. The base in the lower mould is provided with a short movement by means of a knock-out pin whereby the product is pressed from the mould cavity via the forming base and can be incorporated in the production process later on.

If the dimensioning of cutting plate and cutting sleeve changes as a result of temperature fluctuations, this results in the danger of the upper and lower mould coming into jamming contact with each other, which results in damage to the moulds. By now keeping the temperature constant at a relatively low temperature, this danger is minimized.

Some plastics, such as Polyethylene terephthalate (PET), can occur in different forms. If the PET material is brought above the glass temperature and is then cooled rapidly, the resulting PET material will be amorphous. A drawback of products manufactured from this material is that they do not retain their geometry. The product will become plastic again and deform at relatively low temperatures. Amorphous PET is hereby unsuitable for containing hot products such as tea or coffee.

Another form of PET is PET with an increased crystallinity. This is known under the name C-PET (crystalline PET). In this form the polymer chains in the PET are arranged more regularly. The crystalline form can be obtained by not having the PET material cool too quickly, whereby the material is above the glass temperature for a determined period of time, and crystallizes. Another method whereby PET becomes crystalline is by overstretching the material.

A product manufactured from PET material will generally comprise both crystalline and amorphous structures. The ratio of these structures can however be adjusted by the degree of overstretching and by adjusting the cooling process.

In the prior art, moulds which are heated as a whole are used for manufacturing C-PET products. The temperature used for this purpose generally lies in a range of 160-190 degrees Celsius. The PET will crystallize at this temperature.

In the present prior art, three stations are used for the manufacture of C-PET products, i.e. a first station with one or more heated moulds for forming the product, a second station for cooling the formed product, and a third station for cutting out the product.

A drawback of the known C-PET products is that they sometimes have a relatively uniform crystallinity or that the distribution in crystallinity is small or undesired in respect of positioning and/or size.

A further drawback of the known thermoforming devices might in some configurations be that they have to make special provisions to prevent heating of other machine parts of the thermoforming device. This is not possible, or very difficult and/or expensive, for some applications.

Yet another drawback of the known thermoforming devices is that they might, depending on the precise configuration, require three separate stations, which has the effect of increasing cost price.

It is an object of the present invention to provide a solution for one or more of the above stated problems.

According to a first aspect of the invention, this object is achieved by providing a mould suitable for thermoforming a product from a heated plastic film, comprising a base plate and a plurality of forming areas, wherein each forming area comprises: a cavity in the base plate; a cutting sleeve; a forming sleeve; a forming base; and first heat means, wherein the cutting sleeve has a jacket-like shape, the cutting sleeve being placed in the base plate cavity, the forming sleeve being placed in the cutting sleeve, and the forming base being placed in the forming sleeve, wherein the first heat means comprise a first heating element, and wherein the first heating element is placed at a surface of the forming sleeve or within the forming sleeve and is configured to heat the forming sleeve, and first thermal insulating means, wherein the first thermal insulating means are configured to block or limit a heat flow from the forming sleeve and/or the forming base towards the base plate and/or towards the cutting sleeve and/or towards a knock-out pin underneath the forming base; so that each forming area comprises first heat means for heating or keeping heated the forming sleeve relative to the base plate.

Ideally, this invention can influence the temperature of the part of the film which lies against the forming sleeve during cooling in such a way that the temperature remains above the glass temperature of the plastic long enough to obtain a product with an at least partially crystalline structure.

The plastic of the whole product is for instance at least 15 percent crystalline after forming.

Within the context of the present invention, forming sleeve is also understood to mean a forming sleeve which is fixedly connected to a cutting sleeve, such that the forming sleeve has a forming and cutting function and can be placed in the cavity in the base plate as one component.

The plastic film is heated prior to the film being carried into the forming sleeve in order to obtain the necessary plasticity or deformability. The film will cool after the film has been carried into the forming sleeve. It is however achieved with the first heat means that this cooling is slowed down considerably relative to a cooled mould. The plastic hereby has more time to crystallize. Inhibiting the cooling of the plastic can for instance be achieved by heating the forming sleeve and/or by insulating the forming sleeve relative to the colder base plate.

It is to be understood that "thermal insulation means" are meant to reduce a heat flow between a first and a second element of the tool. Therefore, a thermal insulator has at least a heat transition coefficient "h" or "alpha" and/or a thermal conductivity "lambda" that is lower than the heat transition coefficient and/or the thermal conductivity of the first or the second element, being in contact with both the first and the second element. Ideally, the thermal insulator has a heat transition coefficient and/or a thermal conductivity that is lower than the heat transition coefficients and/or the thermal conductivities of both the first and the second element.

Preferably, the thermal insulator has a heat transition coefficient and/or a thermal conductivity that amounts to less than 10% of the heat transition coefficients and/or the thermal conductivities of both the first and the second element, more preferably to less than 1%. E.g., steel has a thermal conductivity of—depending on its alloy composition—between typically 15 and 58 W/(m*K), whereas air has a thermal conductivity of approximately 0.026 W(m*K), technical plastics normally range between e.g. 0.17 and e.g. 0.57 W(m*K), and designated insulation materials, often produced from fibres, range from e.g. 0.004 to e.g. 0.1 W/(m*K).

The thermal insulator might be air or might comprise air or a different gas.

The thermal insulator might be or might comprise a technical plastic material.

In contrast to the prior art, the forming sleeve and the base plate have considerably different temperatures. By heating only or mainly these elements, the temperature increase in the remaining part of the mould can remain relatively limited. Energy can hereby be saved.

Because only the form-defining parts of the mould are heated, the option is created of providing these form-defining parts with a desired temperature profile. It can thus be desired for determined parts of a product, such as an upper side, to be less crystalline than other parts of the product. The first heat means can be configured for this purpose to realize temperature differences in the forming sleeve in a longitudinal direction of the forming sleeve during forming of the product. The maximum temperature differences can be greater than a determined threshold value, for instance 10 degrees Celsius, this depending on the plastic used. This creates the option of achieving different crystallinity of the plastic in the longitudinal direction. It will be apparent to the skilled person that it is also possible to locally control the crystallinity of the plastic by configuring the first heat means accordingly. It is thus possible to impart only a small ring or small section of the product with increased crystallinity.

A further advantage lies in the fact that the invention enables C-PET-based products to be formed and punched in the same mould. This also dispenses with the need to make separate provisions in order to prevent heating/warming of other machine parts.

Alternatively or additionally, the heat means might comprise a heating element, wherein the heating element is placed at a surface of the forming base or within the forming base or underneath the forming base, and is configured to heat the forming base.

The mould can further comprise cooling means for cooling the base plate. Such cooling means for instance comprise conduits in the base plate through which a cooling liquid is guided.

The first heat means can comprise at least one from the group consisting of first thermal insulating means and a first heating element, wherein the first thermal insulating means are configured to block or limit a heat flow directed away from the forming sleeve and film and wherein the first heating element is placed in the vicinity of the forming sleeve and is configured to heat it.

The first heating element preferably lies against the forming sleeve. In such a case there is a direct thermal contact between the first heating element and the forming sleeve. This in contrast to an indirect contact, wherein other components, such as materials with a high heat conduction coefficient, are placed between the forming sleeve and the first heating element.

The first heating element and/or the first thermal insulating means can further be configured to heat the forming sleeve or keep it warm in non-uniform manner in a longitudinal direction thereof. This, once again, to achieve areas with different crystallinity in the final product.

The mould can comprise both said first thermal insulating means and said first heating element per forming area, wherein the first thermal insulating means are configured to block or limit a heat flow coming from the first heating element and directed away from the forming sleeve. The heat generated by the first heating element is hereby relinquished mainly to the forming sleeve or to another product-forming part which has to be heated, and not to the base plate, or to lesser extent.

The first thermal insulating means can comprise a first thermal insulator which, preferably together with the forming sleeve, encloses or surrounds the first heating element. This has the advantage that the main exit energy flow runs to the forming sleeve, as seen from the first heating element.

The first heating element can take a jacket-like or annular form, wherein the first heating element is placed around or in the forming sleeve. The first thermal insulator can also comprise a jacket-like or annular element which is placed around the first heating element.

Each forming area can further comprise a jacket-like cutting sleeve placed in the cavity, wherein the forming sleeve is placed in the cutting sleeve. The cutting sleeve is preferably a jacket-like element, wherein the upper side is configured to cut or punch products from the film together with a cutting plate in an opposite mould.

The cutting sleeve preferably lies against the base plate. There is thereby a direct thermal contact. If the base plate is cooled, as described above, the cutting sleeve will therefore also be cooled.

If a cutting sleeve is used, the first thermal insulator is preferably situated between the cutting sleeve and the forming sleeve. This achieves that the cutting sleeve is substantially thermally insulated relative to the forming sleeve. Thermal expansion of the cutting sleeve as a result of the heating of the forming sleeve can hereby be avoided or limited. The necessary clearance between cutting plate and cutting sleeve is hereby not jeopardized.

The forming sleeve can take an elongate form. The first thermal insulating means can further comprise a spacer element for holding the forming sleeve at a distance relative to the cutting sleeve or base plate transversely of a longitudinal direction of the forming sleeve. This spacer element comprises for instance an O-ring.

The first thermal insulating means can further comprise a hollow air cylinder formed between the forming sleeve and cutting sleeve and/or between the forming sleeve and the base plate. In an embodiment the hollow air cylinder is formed in that the cutting sleeve and forming sleeve or the forming sleeve and the base plate are held at a mutual distance by the spacer element.

The forming sleeve and/or the cutting sleeve can be provided with a recess in transverse direction for forming the hollow air cylinder. In such a case an air cylinder will be formed, even if no spacer element is used.

As stated above, it is recommended for the cutting sleeve not to be heated, or hardly so. This relates mainly to the components of the cutting sleeve which are directly involved in the punching or cutting movement, such as an upper edge. It is however not desirable in all cases for the crystallinity of all parts of the product to be increased. An example is a cup with an upper edge which is additionally deformed after forming of the product in order to make it easier for a user to drink from the cup. Such an operation is referred to as curling. During this operation the already formed product is heated, wherein only the upper edge is curled. If the whole product were to have increased crystallinity, such a process would be very difficult to perform.

For some products it is therefore recommended for the forming sleeve to come into contact with the cutting sleeve or the base plate at a contact surface. This contact surface can be annular or jacket-like. There can however also be a plurality of individually separate contact surfaces in the peripheral direction. The forming sleeve will relinquish heat to the cutting sleeve at and close to the contact surfaces, and it can be achieved that the product will not take on a structure with increased crystallinity at and close to these surfaces.

The contact surface or the contact surfaces is or are preferably situated in the vicinity of an outer surface of the base plate directed toward the plastic film. In an embodiment the air cylinder extends between the contact surface or the contact surfaces and the spacer element parallel to the longitudinal direction of the forming sleeve.

Each forming area can further comprise a forming base placed in the forming sleeve and second heat means for heating or keeping heated the forming base relative to a knock-out pin and/or the base plate, such that the temperature of the part of the film which lies against the forming base during cooling remains above the glass temperature of the plastic long enough to obtain a product with an at least partially crystalline structure. The second heat means can here comprise at least one, but preferably two, from the group consisting of second thermal insulating means and a second heating element, wherein the second thermal insulating means are configured to block or limit a heat flow directed away from the forming base and film and wherein the second heating element is placed in the vicinity of the forming base and is configured to heat it. It is recommended for the second heating element to lie against the forming base for realizing a direct thermal contact.

In some embodiments the forming base can move for the purpose of knocking out a product. Each forming area can thus comprise a knock-out pin for moving the forming base for the purpose of said knocking out. In such a case the second thermal insulating means can comprise a second thermal insulator which is placed between the forming base and the knock-out pin.

The mould can comprise one or more sensors for detecting a temperature in the forming base and/or forming sleeve of one or more forming areas. It is therefore possible that a plurality of sensors is used per forming area. The temperature of the form-defining parts can hereby be controlled locally. This is particularly the case when the heating elements can also be divided into different areas which are each individually controllable.

The present invention also provides a mould system provided with a mould with sensors as described above. This system further comprises an energy source for providing energy to the first and/or second heating elements and a control unit for controlling an amount of power which is supplied to the first and/or second heating elements. The control unit is configured here to control subject to the measured temperature or measured temperatures. This makes it possible in an embodiment to control the temperature separately for each forming area. This likewise creates the option of exposing the film to different temperatures at different positions.

The present invention likewise provides a thermoforming device comprising the above described mould system and/or comprising the above described mould.

It will be apparent to the skilled person that a thermoforming device usually comprises two moulds. The present invention is preferably applied in at least one of these moulds. The other mould comprises in some cases a movable pre-stretcher which is used to carry the film into the forming sleeve. It is further noted that the present invention also relates to a thermoforming device wherein an already known mould, such as an upper mould with a pre-stretcher, is combined with the mould according to the invention.

The invention will be discussed in more detail hereinbelow with reference to the accompanying figures, wherein.

Figure 1:
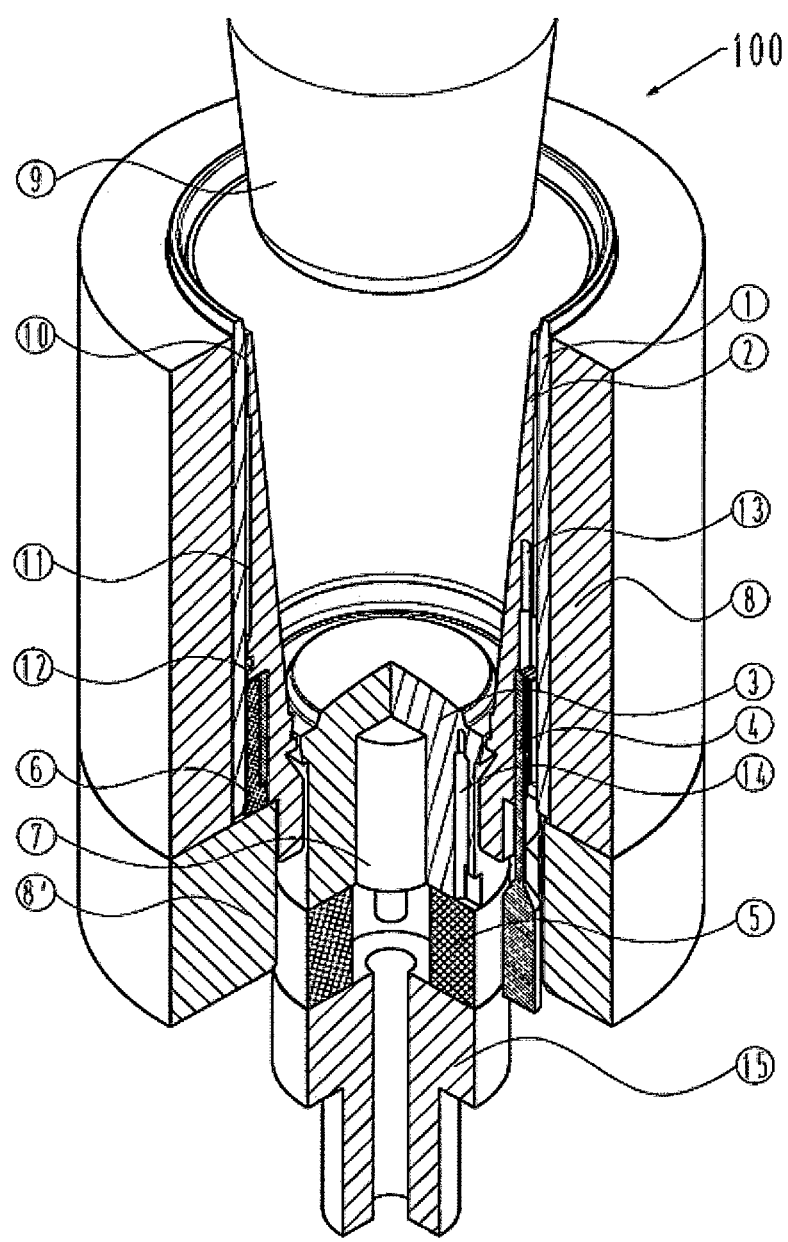
FIG. 1 shows a partially cut-away perspective view of an embodiment of a mould according to the present invention.

The view of FIG. 1 shows a mould 100, shown here as a lower mould. Mould 100 forms part of a thermoforming device which further also comprises an upper mould. A pre-stretcher 9 is accommodated in this upper mould. A plastic film which is clamped between mould 100 and the upper mould can be carried into a forming sleeve 2 using pre-stretcher 9. Forming sleeve 2 is placed in a cavity in a base plate, which comprises plates 8 and 8' in FIG. 2. It is noted that FIG. 1 only shows plate 8.

FIG. 1 shows a forming area, i.e. an area in mould 100 in which a product is formed. Mould 100 generally comprises a plurality of this type of area for substantially simultaneously forming a plurality of products. The following description relates to a single forming area. It will be apparent to the skilled person that the invention can be applied to a plurality of forming areas or even every forming area.

Mould 100 further comprises a cutting sleeve 1 which is likewise placed in the cavity of base plate 8, 8'. FIG. 1 shows a contact surface 10 where cutting sleeve 1 comes into contact with forming sleeve 2. Such surfaces can be arranged at separate positions in the peripheral direction. It is also possible for these surfaces to come into contact with each other, whereby a ring is defined. Cutting sleeve 1 and forming sleeve 2 are in direct thermal contact with each other at the contact surface(s).

Mould 100 further comprises a forming base 3. This is accommodated movably in forming sleeve 2.

Figure 2:
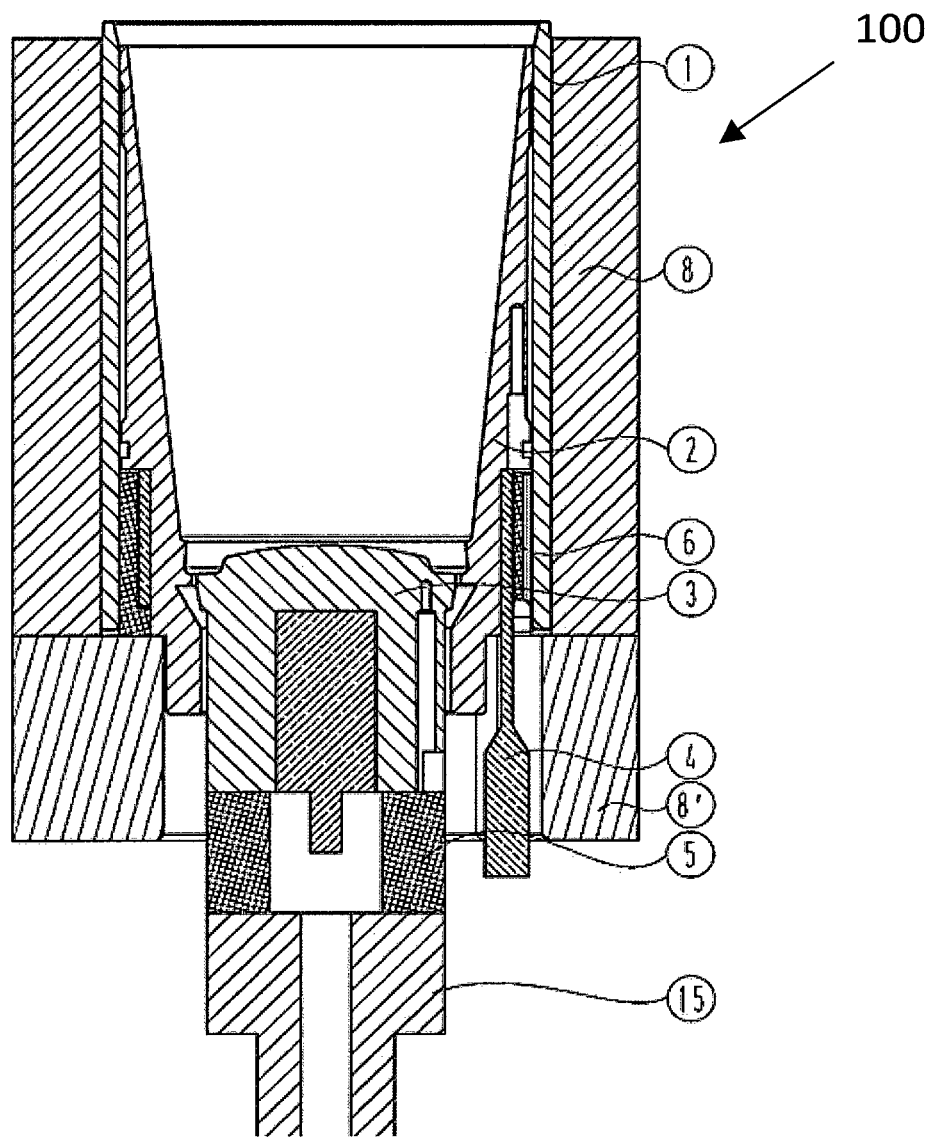
FIG. 2 shows a cross-section of the embodiment of FIG. 1.

FIG. 2 shows a knock-out pin 15 which is connected to a thermal insulator 5. This latter element provides for a thermal insulation between a forming base 3 and a knock-out pin 15. This isolation is provided for preventing the forming base 3 to be cooled too much because of the knock-out pin 15 which will in practice be actively cooled (cooling not shown).

A heating element is also arranged for heating forming sleeve 2. This is a jacket-like element 4 which is thermally insulated relative to cutting sleeve 1 by a thermal insulator 6.

Heating elements 4, 7 can for example be embodied as electrical heating elements. The invention however does not preclude the use of other heating elements, such as elements on the basis of liquid or induction. The invention can also be applied in embodiments without heating elements, wherein the forming sleeve is heated by the heated film.

Cutting sleeve 1 and forming sleeve 2 are held at a mutual distance by a spacer element which is embodied as a heat-resistant O-ring 12. This creates an air gap 11 between cutting sleeve 1 and forming sleeve 2. Air gap 11 extends around forming sleeve 2 so that an air cylinder is formed which is substantially provided with stationary air. O-ring 12 also provides for a positioning of forming sleeve 2 relative to cutting sleeve 1.

A temperature sensor 13 is provided to measure the temperature in forming sleeve 2. A temperature sensor 14 is in similar manner provided in forming base 3 for measuring the temperature.

Figure 3:
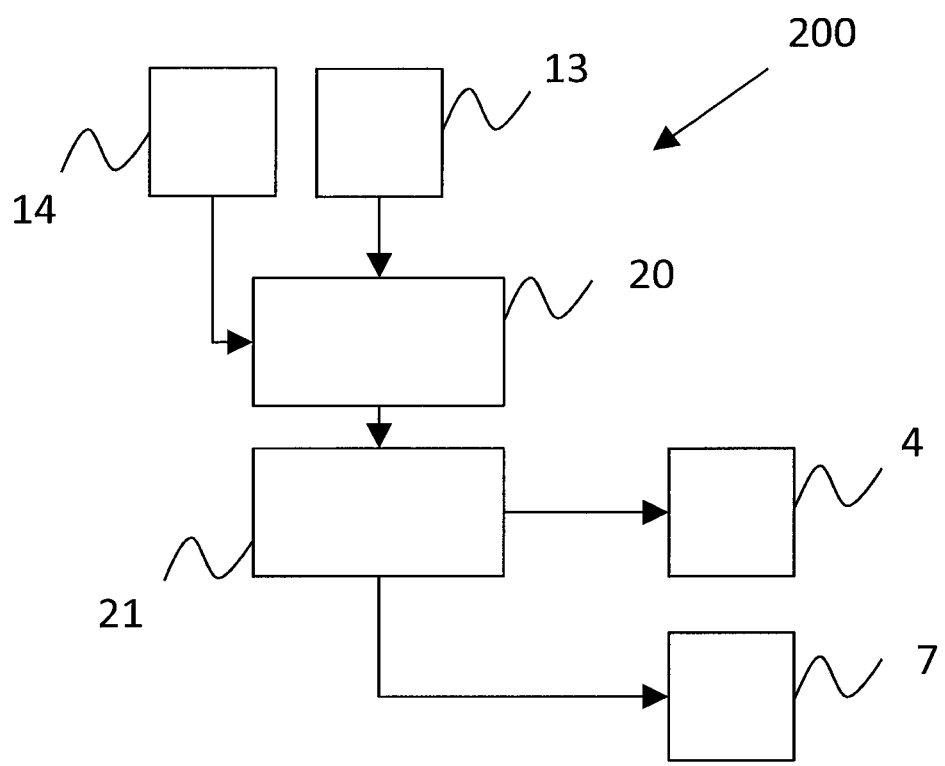
FIG. 3 shows an embodiment of a mould system comprising the mould of FIG. 1.

FIG. 3 shows an embodiment of a mould system 200 comprising mould 100. FIG. 3 shows here a control unit 20 for controlling an amount of power which is supplied to heating elements 4, 7. Also visible is an energy source 21 which is configured to provide energy to heating elements 4, 7. Control unit 20 makes use here of measurements by sensors 13, 14.

It is recommended for control unit 20 to be able to control the temperature separately for each forming area, if desired with a different control or temperature control for forming base 3 and forming sleeve 2. A single control unit 20 can here provide for the control for a plurality of or all forming areas of mould 100.

The operation of mould 100 can be described as follows:

As first step, a heated plastic film is carried between the upper mould and mould 100. This film is pushed downward in forming sleeve 2 by pre-stretcher 9. The film will then be carried against the wall of forming sleeve 2 and forming base 3 by means of vacuum or compressed air. Forming sleeve 2 is heated here by heating element 4, and forming base 3 by heating element 7. Both forming sleeve 2 and forming base 3 hereby have a determined temperature, whereby the film will be above the glass temperature for a longer time. When the film is for instance 140 degrees Celsius, forming sleeve 2 and forming base 3 can for instance be 60 degrees Celsius. The film then cools from 140 to 60 degrees Celsius and is hereby above the glass temperature of 70 degrees Celsius for a longer time. The plastic, for instance PET, will display an increased crystallinity as a result hereof. This is however not the case for the upper side of the product. This is because the heat in forming sleeve 2 is here discharged through contact surfaces 10 to cutting sleeve 1. This heat transport is such that the crystallinity is not increased, or is increased only to limited extent, on the upper side of the product, and that the heating of cutting sleeve 1 remains acceptable for a good cutting or punching operation, which will be described in a moment. This latter can be achieved in relatively simple manner in that the rest of cutting sleeve 1 is not heated via thermal insulator 6 and in that base plate 8, 8', which is in direct thermal contact with cutting sleeve 1, is actively cooled, for instance by means of water cooling.

After enough time, the product will be separated from the rest of the film. Mould 100 and the upper mould perform for this purpose a small relative stroke, whereby cutting sleeve 1 will move along a cutting plate in the upper mould. The film situated between cutting sleeve 1 and the cutting plate will be cut as a result of this movement.

The product can then be ejected. This is achieved by moving knock-out pin 15 relative to base plate 8, 8'. Forming base 3 is hereby pushed upward relative to forming sleeve 2, and the product can be removed from lower mould 100 or the product is ejected from mould 100. It is noted here that knock-out pin 15 is thermally insulated relative to heating element 7. As final step, knock-out pin 15 will move back to the original position, after which the process can be repeated.

The system shown in FIG. 3 has the advantage that it can be realized that cutting sleeve 1 and the cutting plate have the same temperature. The cutting clearance between these cutting parts is only a maximum of several hundreds of micrometers. If there were a temperature difference between these cutting parts, this would cause a different expansion of the cutting parts, whereby the moulds can become damaged. This also causes problems with the cutting of the product out of the film, as described above.

It follows from the above description that only the forming parts are heated, instead of the whole mould. As a result, the energy costs are considerably reduced. In addition, it is possible to have the bottom and the side wall of the product crystallize in the mould, wherein the upper edge of the product is not given the opportunity to crystallize, or hardly so. This has the advantage relative to the present prior art that a product can also be curled after the thermoforming process. In addition, it is possible to cut the product with increased crystallinity in the mould in which the product is formed because the cutting parts have a low temperature, in contrast to the forming sleeve and the base. This dispenses with the need to use a plurality of stations.

It will be apparent to the skilled person that the present invention is not limited to the above discussed embodi-

The invention claimed is:

1. Mould suitable for thermoforming a product from a heated plastic film, comprising
a base plate and a plurality of forming areas,
wherein each forming area comprises:
a cavity in the base plate;
a cutting sleeve;
a forming sleeve;
a forming base; and
first heat means,
wherein the forming sleeve can be heated and the cutting sleeve can be cooled,
wherein the cutting sleeve has a jacket-like shape that defines a cavity, the cutting sleeve being placed in the base plate cavity, the forming sleeve being placed in the cavity of the cutting sleeve, and the forming base being placed in the forming sleeve,
wherein the first heat means comprise
a first heating element, wherein the first heating element is placed at a surface of the forming sleeve or within the forming sleeve and is configured to heat the forming sleeve, and
the mould further comprises cooling means which are configured to actively cool the base plate which is in thermal contact with the cutting sleeve so that the cutting sleeve is cooled, wherein the cooling means comprises conduits in the base plate through which a cooling fluid is guided,
first thermal insulating means, wherein the first thermal insulating means are configured to block or limit a heat flow from the forming sleeve and/or from the forming base towards the base plate and/or towards the cutting sleeve and/or towards a knock-out pin underneath the forming base, wherein the first thermal insulating means comprises a first thermal insulator which is situated between the cutting sleeve and the forming sleeve and which thermally insulates the cutting sleeve from the forming sleeve; so that each forming area comprises first heat means for heating or keeping heated the forming sleeve relative to the base plate which is cooled during thermoforming a product.

2. Mould suitable for thermoforming a product from a heated plastic film, comprising a base plate and a plurality of forming areas,
wherein each forming area comprises:
a cavity in the base plate;
a cutting sleeve;
a forming sleeve;
a forming base; and
heat means,
wherein the forming sleeve and the forming base can be heated and the cutting sleeve can be cooled,
wherein the cutting sleeve has a jacket-like shape that defines a cavity, the cutting sleeve being placed in the base plate cavity, the forming sleeve being placed in the cavity of the cutting sleeve, and the forming base being placed in the forming sleeve,
wherein the heat means comprise
a heating element, wherein the heating element is placed at a surface of the forming base or within the forming base or underneath the forming base, and is configured to heat the forming base, and
the mould further comprises cooling means which are configured to actively cool the base plate which is in thermal contact with the cutting sleeve so that the cutting sleeve is cooled, wherein the cooling means comprises conduits in the base plate through which a cooling fluid is guided
first thermal insulating means, wherein the first thermal insulating means are configured to block or limit a heat flow from the forming sleeve and/or from the forming base towards the base plate and/or towards the cutting sleeve and/or towards a knock-out pin underneath the forming base, wherein the first thermal insulating means comprises a first thermal insulator which is situated between the cutting sleeve and the forming sleeve and which thermally insulates the cutting sleeve from the forming sleeve; so that each forming area comprises first heat means for heating or keeping heated the forming base relative to the base plate which is cooled during thermoforming a product.

3. The mould as claimed in claim 1, wherein the first heat means are configured to realize temperature differences in the forming sleeve in a longitudinal direction of the forming sleeve during forming of the product.

4. The mould as claimed in claim 1, wherein the first heating element lies against the forming sleeve and/or wherein the first heating element and the first thermal insulating means are configured to heat the forming sleeve or keep it warm in non-uniform manner in a longitudinal direction thereof.

5. The mould as claimed in claim 1, wherein the mould comprises both said first thermal insulating means and said first heating element per forming area, wherein the first thermal insulating means are configured to block or limit a heat flow coming from the first heating element and directed away from the forming sleeve.

6. The mould as claimed in claim 5, wherein the first thermal insulator together with the forming sleeve encloses or surrounds the first heating element.

7. The mould as claimed in claim 6, wherein the first heating element takes a jacket-like or annular form and is placed around or in the forming sleeve, wherein the first thermal insulator comprises a jacket-like or annular element which is placed around the first heating element.

8. The mould as claimed in claim 1, wherein the cutting sleeve lies against the base plate.

9. The mould as claimed in claim 1, wherein the forming sleeve is elongate and wherein the first thermal insulating means further comprise a spacer element for holding the forming sleeve at a distance relative to the cutting sleeve or base plate transversely of a longitudinal direction of the forming sleeve.

10. The mould as claimed in claim 9, wherein the spacer element comprises an O-ring.

11. The mould as claimed in claim 1, wherein the first thermal insulating means comprise a hollow air cylinder formed between the forming sleeve and cutting sleeve and/or between the forming sleeve and the base plate.

12. The mould as claimed in claim 11, wherein the forming sleeve and/or the cutting sleeve is provided with a recess in transverse direction for forming the hollow air cylinder.

13. The mould as claimed in claim 1, wherein the forming sleeve comes into contact with the cutting sleeve or the base plate at a contact surface.

14. The mould as claimed in claim 13, wherein the contact surface is annular or jacket-like.

15. The mould as claimed in claim 13, wherein there are a plurality of individually separate contact surfaces in the peripheral direction.

16. The mould as claimed in claim 15, wherein the contact surface or the contact surfaces is or are situated in the vicinity of an outer surface of the base plate directed toward a designated plastic film position.

17. The mould as claimed in claim 1, wherein each forming area further comprises a forming base placed in the forming sleeve and second heat means for heating or keeping heated the forming base relative to a knock-out pin and/or the base plate, preferably such that the temperature of the part of the film which lies against the forming base during cooling remains above the glass temperature of the plastic long enough to obtain a product with an at least partially crystalline structure, wherein the second heat means comprise a second heating element which is placed.

18. The mould as claimed in claim 17, wherein the second heat means comprise at least one from the group consisting of second thermal insulating means and a second heating element, wherein the second thermal insulating means are configured to block or limit a heat flow directed away from the forming base and film, wherein the second thermal insulating means comprises a second thermal insulator which is placed between the forming base and the knock-out pin, and wherein the second heating element is placed in the vicinity of the forming base and is configured to heat it.

19. The mould as claimed in claim 18, wherein the second heating element lies against the forming base.

20. The mould as claimed in claim 19, wherein the forming base is moveable for the purpose of knocking out a product and wherein each forming area comprises a knock-out pin for moving the forming base for the purpose of said knocking out.

21. The mould as claimed in claim 20, wherein the second insulating means comprise a second thermal insulator which is placed between the forming base and the knock-out pin.

22. The mould as claimed in claim 1, comprising one or more sensors for detecting a temperature in the forming base and/or forming sleeve of one or more forming areas.

23. Mould system comprising a mould as claimed in claim 22, comprising: an energy source for providing energy to the first and/or second heating elements; a control unit for controlling an amount of power which is supplied to the first and/or second heating elements; wherein the control unit is configured to control subject to the measured temperature or measured temperatures.

24. Mould system as claimed in claim 23, wherein the control unit is configured to control the temperature separately for each forming area.

25. Thermoforming device comprising the mould system as claimed in claim 24.

26. Method for thermoforming a product from a heated plastic film, using the thermoforming device of claim 25, wherein the plastic of a whole product is kept to at least 15 percent crystalline after forming of the product.

27. A Mould suitable for thermoforming a product from a heated plastic film,
comprising a base plate and a plurality of forming areas,
wherein each forming area comprises:
forming parts,
cutting parts, and
a first heating element,
wherein the forming parts comprise a forming sleeve and a forming base,
wherein the cutting parts comprise a cutting sleeve,
wherein the cutting sleeve has a jacket-like shape that defines a cavity, the cutting sleeve being placed in a base plate cavity, the forming sleeve being placed in the cavity of the cutting sleeve, and the forming base being placed in the forming sleeve,
wherein the forming parts are actively heated by means of the first heating element, which is placed at a surface of the forming sleeve and is configured to heat the forming sleeve,
wherein the cutting parts are actively cooled by means of a cooling means which is configured to actively cool the base plate which is in thermal contact with the cutting sleeve so that the cutting sleeve is cooled, and
wherein a first thermal insulator is situated between the cutting sleeve and the forming sleeve which thermally insulates the cutting sleeve from the forming sleeve.

28. A Mould suitable for thermoforming a product from a heated plastic film,
comprising a base plate and a plurality of forming areas,
wherein each forming area comprises:
a cavity in the base plate;
a forming sleeve;
a forming base; and
first heat means,
wherein the forming sleeve can be heated,
wherein the forming sleeve being placed in the base plate cavity, and the forming base being placed in the forming sleeve,
wherein the base plate surrounds the forming sleeve and the base plate cavity,
wherein the forming base is moveable relative to the forming sleeve,
wherein the first heat means comprise
a first heating element, wherein the first heating element is placed at a surface of the forming sleeve or within the forming sleeve and is configured to heat the forming sleeve, and
the mould further comprises cooling means which are configured to actively cool the base plate, wherein the cooling means comprises conduits in the base plate through which a cooling fluid is guided,
first thermal insulating means, wherein the first thermal insulating means are configured to block or limit a heat flow from the forming sleeve and/or from the forming base towards the base plate and/or towards a knock-out pin underneath the forming base,
wherein the first thermal insulating means comprises a first thermal insulator;
so that each forming area comprises first heat means for heating or keeping heated the forming sleeve relative to the base plate which is cooled during thermoforming a product.

* * * * *